(12) United States Patent
Shimizu et al.

(10) Patent No.: US 6,391,488 B1
(45) Date of Patent: May 21, 2002

(54) NON-AQUEOUS ELECTROLYTE CELL (75) Inventors: Toshiyuki Shimizu, Kadoma; Hideki Fukuda, Kyotanabe; Toshiya Kuwamura, Nara; Takayuki Tanahashi, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/610,864

(22) Filed: Jul. 6, 2000

(30) Foreign Application Priority Data

Jul. 9, 1999 (JP) .......................................... 11-195648

(51) Int. Cl.⁷ ............................................... H01M 6/10
(52) U.S. Cl. ..................... 429/94; 429/131; 429/130; 429/144; 429/146; 429/126; 429/231.95
(58) Field of Search ......................... 429/94, 124, 126, 429/127, 130, 213.95, 131, 144, 146

(56) References Cited

U.S. PATENT DOCUMENTS 4,963,445 A * 10/1990 Marple et al. ................. 429/94
5,965,290 A * 10/1999 Shimizu et al. ............... 429/94

FOREIGN PATENT DOCUMENTS

| JP | 5-13089 | 1/1993 | |
|---|---|---|---|
| JP | 05013089 A | * 1/1993 | ............ H01M/6/16 |

* cited by examiner

Primary Examiner—Carol Chaney
Assistant Examiner—Angela J. Martin
(74) Attorney, Agent, or Firm—McDermott, Will & Emery (57) ABSTRACT

The present invention relates to an improved non-aqueous electrolyte cell comprising an anode, a cathode and a separator spirally wound so that the anode is disposed on the outer side of the cathode to form an electrode assembly. The outermost end of the cathode is wrapped with an electrically insulating material, the anode has a section provided with an anode current collector in the vicinity of the outermost end thereof, and the section is positioned beyond the wrapped outermost end of the cathode. A reaction suppressing layer is present between a cathode section in the vicinity of the outermost end and the anode positioned on the inner side thereof, thereby only the outer side of the cathode section substantially reacts with the anode. This cell ensures disconnection of remaining non-reacted anode component from the current collector when forcedly discharged at the last stage of discharge, causing little capacity loss.

14 Claims, 7 Drawing Sheets

NON-AQUEOUS ELECTROLYTE CELL

BACKGROUND OF THE INVENTION

The present invention relates to a non-aqueous electrolyte cell comprising an electrode assembly including an anode in the form of a belt consisting essentially of a consumable light metal such as lithium, a cathode in the form of a belt and a separator interposed between the anode and the cathode. The anode, the separator and the cathode are spirally wound so that the anode is positioned on the outer side of the cathode. More specifically, the present invention relates to a non-aqueous electrolyte cell in which an anode collector is disconnected from the anode light metal remaining in the outermost spiral of the electrode assembly at the last stage of discharge.

Non-aqueous electrolyte cells using a consumable light metal such as lithium as the anode active material and using oxide or the like as the cathode active material has various advantages hardly seen in other primary cells; for example, such cells have a high voltage, a high energy density, small self discharge and remarkably long shelf life. Consequently, such cells have -a rapidly growing demand in recent years and have been applied to a variety of electronic devices.

Non-aqueous electrolyte cells of this kind generally comprise an electrode assembly including an anode strip in the form of a belt, a cathode strip in the form of a belt and a separator interposed therebetween. The anode, the separator and the cathode are spirally wound so that the anode is positioned on the outer side of the cathode. The section of the anode positioned in the outermost spiral of the spirally wound electrode assembly has only its inner side facing the cathode, therefore such section of the anode has smaller rate of consumption compared to the inner section of the anode, sandwiched by the cathode on both sides. In a construction where the anode current collector is disposed in the outermost spiral of the spirally wound electrode assembly and the outermost end of the anode is positioned slightly further than that of the cathode in the winding direction, discharge capacity making good use of the anode light metal can be obtained. In such a construction, however, an active light metal remains in electrical contact with the anode current collector even when the cell is in the last stage of discharge.

When the cell in such a state is forcedly discharged or subjected to voltage reversal by being connected in series with a cell with small discharge amount or with a new cell, the light metal in the anode dissolves and electrolytically plates onto the cathode. If such forced discharge continues, the light metal electrolytically plating onto the cathode breaks through the separator to cause an internal short circuit. If an internal short circuit occurs, a tremendous amount of current surges through the internal short circuit section, causing a rapid rise in temperature. Further, if sparks generate inside the cell filled with gas at an internal short circuit, the sparks might become an ignition source and might ignite the cell.

Figure 10:
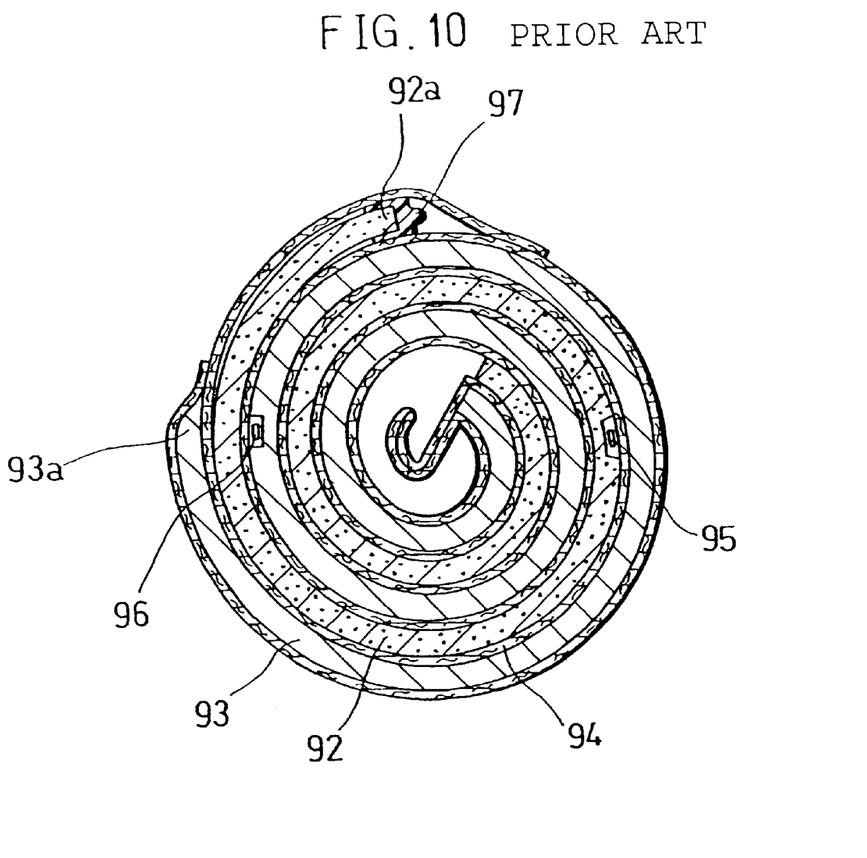
FIG. 10 is a horizontal cross sectional view illustrating a conventional electrode assembly.
Figure 11:
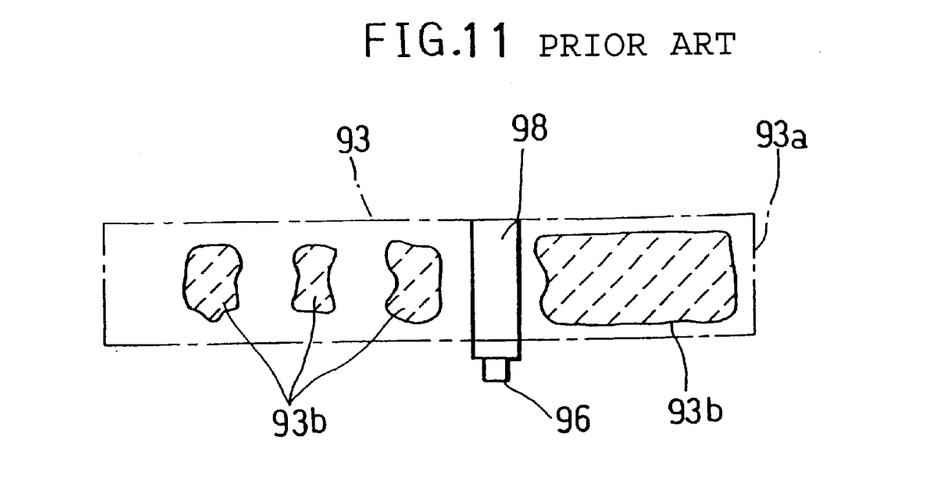
FIG. 11 is a development of the anode of a cell using the same electrode assembly at the last stage of discharge.

In order to avoid the above-described inconveniences, as shown in FIG. 10, it has been proposed to dispose an anode current collector 96 at one revolution or further inward from an outermost end 93a of an anode 93, that is, at the winding beginning side, and to constitute so that an outermost end 92a of a cathode 92 reacts only with the anode on its inner side of spiral. With this construction, as shown in FIG. 11, an anode metal 93b remaining in the outermost spiral is disconnected from the current collector 96 at the last stage of discharge (disclosed in Japanese Laid-Open Patent Publication Hei 5-13089).

Nevertheless, for practical use, when producing an electrode assembly by laying one on top of another the cathode, the anode and the separator, each being in the form of a belt, and spirally winding these cathode, anode and separator by means of an automatic winding apparatus, it is very difficult to secure a cathode section that is not in opposition to the anode on the outer spiral by positioning the outermost end of the anode so that the outermost end of the cathode reacts only with the anode on its inner side.

Further, disconnecting the anode metal in the outermost spiral from the anode current collector at the last stage of discharge by positioning the anode current collector at one revolution or further inward from the outermost end of the anode means rendering the use of the cell impossible although the anode active material capable of discharging remains and leads to a decrease in discharge capacity.

BRIEF SUMMARY OF THE INVENTION

The present invention aims at solving the above-described inconveniences with the conventional non-aqueous electrolyte cells.

It is an object of the present invention to provide a non-aqueous electrolyte cell ensuring disconnection of remaining non-reacted anode active material from the anode current collector when forcedly discharged at the last stage of discharge and having an improved discharge capacity.

A non-aqueous electrolyte cell according to the present invention comprises an anode consisting essentially of a light metal, a cathode, a separator interposed between the anode and the cathode, an organic electrolyte and a cell case containing the above anode, cathode, separator and organic electrolyte; the anode, cathode and separator being spirally wound so that the anode is positioned on the outer side of the cathode to form an electrode assembly, wherein the outermost end of the cathode is wrapped with an electrically insulating material, wherein the anode has a section provided with an anode current collector in the vicinity of the outermost end thereof, the section being positioned beyond the wrapped outermost end of the cathode in the winding direction of the spiral, and wherein a reaction suppressing layer is present between a cathode section in the vicinity of the outermost end and the anode positioned on the inner side of the above-mentioned cathode section, whereby only the outer side of the cathode section in the vicinity of the outermost end substantially reacts with the anode.

In the non-aqueous electrolyte cell according to the present invention, in the section where the cathode faces the reaction suppressing layer, the cathode reacts with the anode on its outer side in preference to the cathode on its inner side. As a result, at the last stage of discharge, the anode section on the outer side facing the specific section of the cathode is rapidly depleted, and consequently, the anode metal in the inward side from the depleted section is disconnected from the current collector. Since the anode current collector is disposed in the vicinity of outermost end of the anode, the amount of the anode metal remaining in contact with the current collector is very small at the stage where the current collector is disconnected from the anode metal in the inward side, permitting better use of the anode capacity.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

In a non-aqueous electrolyte cell according to the present invention, a spirally wound electrode assembly is constituted so that the anode is positioned on the outer side of the cathode, as described in the above. Further, the outermost end of the cathode is wrapped with an electrically insulating material; the anode has a section provided with an anode current collector in the vicinity of the outermost end thereof, and the section is positioned beyond the wrapped outermost end of the cathode in the winding direction of the spiral; and a reaction suppressing layer is present between a cathode section in the vicinity of the outermost end and the anode positioned on the inner side of the above-mentioned cathode section, thereby only the outer side of the cathode section in the vicinity of the outermost end substantially reacts with the anode.

In a preferred mode of the present invention, the reaction suppressing layer is disposed on the inner side of the section of the cathode in the vicinity of the outermost end.

In another preferred mode of the present invention, the reaction suppressing layer is disposed on the outer side of the anode facing the inner side of the above-mentioned cathode section in the vicinity of the outermost end.

The anode current collector is preferably positioned at the outermost end of the anode.

The electrically insulating material used here wraps the outermost end of the cathode and plays the role of preventing the cathode mixture from being cracked and falling out, and preventing a burr of the current collector exposed in the cross section of the cathode from breaking through the separator. Therefore, a mesh or a non-woven fabric may be used as far as it has electrically insulating property. Ionically impermeable materials are preferable. Representative preferred materials include synthetic resin tape comprising polypropylene, aramid resin, polyester and the like, known as an insulating tape, or a glass cross tape. Those containing an adhesive are preferable.

As the reaction suppressing layer used here for suppressing the reaction between the cathode and the anode on its inner side, materials that do not easily permeate ions may be used. Ionically impermeable and electrically insulating materials are preferable. Materials similar to those used for the above insulating tape can be preferably used.

It is preferable that the above-mentioned electrically insulating material and the reaction suppressing layer are electrolyte-resistant.

In one aspect of the present invention, the non-aqueous electrolyte cell comprises an anode consisting essentially of a light metal, a cathode, a separator interposed between the anode and the cathode, an organic electrolyte and a cell case containing the above anode, cathode, separator and organic electrolyte; the above anode, cathode and separator being spirally wound so that the anode is positioned on the outer side of the cathode to form an electrode assembly, wherein the outermost end of the cathode is wrapped with a first film made of an ionically impermeable and electrically insulating material, wherein the anode has a section provided with an anode current collector in the vicinity of the outermost end thereof, the section being positioned beyond the outermost end of the cathode wrapped with the first film in the winding direction of the spiral, and wherein the inner side of the cathode section in the vicinity of the outermost end is covered with a second film made of an ionically impermeable and electrically insulating material without forming a gap between the first film and the second film, whereby only the outer side of the cathode section in the vicinity of the outermost end substantially reacts with the anode.

In a preferred embodiment of the present invention, the end of the first film covers the end of the second film.

In another preferred embodiment of the present invention, the second film is constituted with an extended end part of the first film.

In another aspect of the present invention, the non-aqueous electrolyte cell comprises an anode consisting essentially of a light metal, a cathode, a separator interposed between the anode and the cathode, an organic electrolyte and a cell case containing the above anode, cathode, separator and organic electrolyte; the above anode, cathode and separator being spirally wound so that the anode is positioned on the outer side of the cathode to form an electrode assembly, wherein the outermost end of the cathode is wrapped with a first film made of an ionically impermeable and electrically insulating material, wherein the anode has a section provided with an anode current collector in the vicinity of the outermost end thereof, the section being positioned beyond the outermost end of the cathode wrapped with the first film in the winding direction of the spiral, and wherein a section of the anode positioned in the inner side of the cathode section in the vicinity of the outermost end and facing the cathode is covered with a second film made of an ionically impermeable and electrically insulating material, whereby only the outer side of the cathode section in the vicinity of the outermost end substantially reacts with the anode.

In the present invention, remaining anode light metal is completely disconnected from the current collector when the cell is forcedly discharged at the last stage of discharge. Consequently, problems such as occurrence of an internal short circuit caused by remaining anode metal electrolytically plating onto the cathode will be eliminated. Further, the section where the anode light metal is disconnected from the current collector is positioned in the outermost spiral of the electrode assembly and has only its inner side facing the cathode, therefore disconnection takes place at relatively late at the last stage of discharge. In consequence, the amount of the anode metal loss caused by the above disconnection is very small, permitting a cell with a large capacity. The anode current collector is positioned, in the outermost spiral of the electrode assembly, further outwardly than the outermost end of the cathode in the winding direction. For such a purpose, the anode may be made sufficiently longer than that of the cathode, and it is easy to secure the relative positional relation between the cathode and the anode.

In the followings, a preferred embodiment of the present invention will be described in referring to accompanying drawings. It should be noted that the drawings show schematic views and, in particular, relative sizes and positions of each component of the electrode assembly are not necessarily correct.

EMBODIMENT 1

Figure 1:
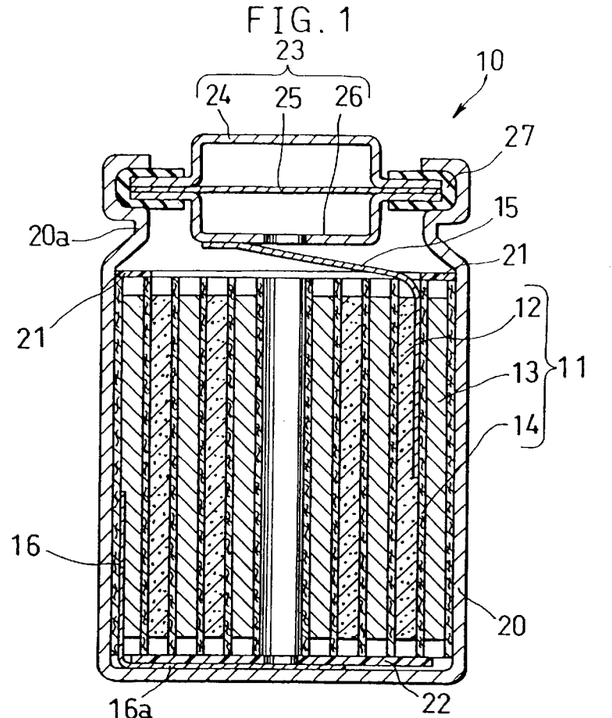
FIG. 1 is a vertical cross sectional view illustrating a non-aqueous electrolyte cell according to one example of the present invention.
Figure 2:
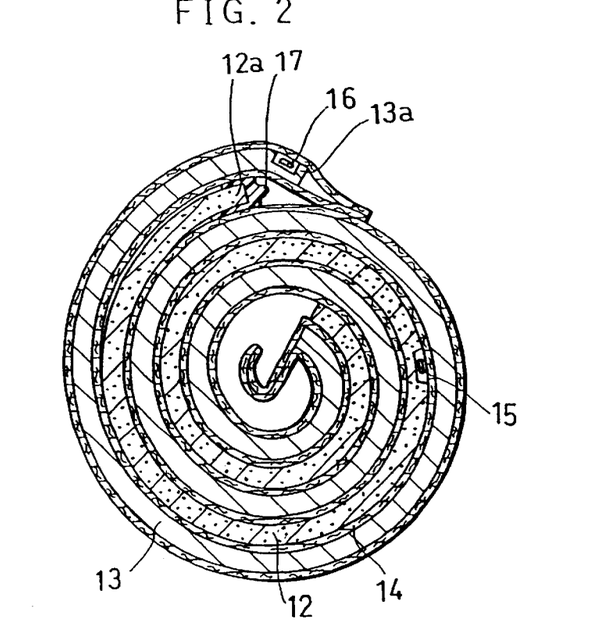
FIG. 2 is a horizontal cross sectional view illustrating the same cell.

FIG. 1 is a vertical sectional view of a non-aqueous electrolyte cell according to the present embodiment. FIG. 2 is a horizontal sectional view of an electrode assembly of the same cell. Numeral 10 designates the non-aqueous electrolyte cell. A cylindrical cell case 20 made of iron and having a bottom surface also serves as an anode terminal, and inside the case, a spirally wound electrode assembly 11 is contained together with an organic electrolyte stable against a light metal serving as the anode active material. An upper opening of the case 20 is sealed in airtight and liquid-tight fashion by applying a packing 27 to the circumference of a sealing member 23 and caulking the opening end of the case to the packing. The sealing member 23 is composed of an upper lid 24, a valve 25 made of a thin metal film and a lower lid 26.

The electrode assembly 11 is constituted, as shown in FIG. 2, by laying one top of another a cathode 12 in the form of a belt, a separator 14 made of microporous polypropylene film and an anode 13 in the form of a belt consisting of a lithium sheet in this order, and spirally winding these so that the anode 13 is positioned on the outer side of the cathode 12. The cathode 12 is prepared as follows: 7 parts by weight of a carbon powder as the conductive agent and 7 parts by weight of a fluorocarbon resin powder as the binding agent are added to 100 parts by weight of manganese dioxide as the active material to prepare a cathode mixture; the cathode mixture is then applied onto an expanded metal made of stainless steel serving as the current collector; subsequently, the resultant is pressed with rollers and cut into a predetermined size. In the cathode, a cathode lead terminal 15 made of stainless steel is welded to the expanded metal exposed by removing a part of the cathode mixture. The anode 13 includes an anode current collector 16 pressed and adhered onto the surface of the lithium sheet at the outermost end of the anode. The anode current collector 16 is prepared by giving a treatment for roughened surface by embossing to a sheet made of nickel or a clad metal of iron and nickel. An insulating tape with an adhesive is attached to both surfaces of the part fixed with the lead terminal of the cathode and the part fixed with the current collector of the anode, while not shown in the figure.

An insulating film 17 is adhered to the outermost end part that is to be the outermost end of the cathode 12 in order to prevent occurrence of an internal short circuit caused by a burr of the current collector formed when a long sheet for cathode is cut into separate cathodes breaking through the separator. Of the insulating film 17, a section 17b covering the inner side of the cathode 12 is made longer in the inward direction than a section 17a covering the outer side of the cathode 12. Consequently, of section 17b covering the inner side, section 17c, which is an inward extended section compared to section 17a covering the outer side, acts as a layer for inhibiting the cathode reaction. That is, in the vicinity of the outermost end 12a of the cathode 12, the section denoted by 12x in FIG. 3 has only its outer side facing the anode 13.

The electrode assembly 11 constructed as described above is inserted into a cell case 20 with insulating plates 21 and 22 disposed in the upper part and the lower part, respectively. A lead tab 16a, which extends from the anode current collector 16 while being united with the same, is bent to be placed under the insulating plate 22 disposed in the lower part of the electrode assembly. This anode lead is welded to the bottom side of the cell case 20 by means of an electrode for welding inserted into the center hole of the electrode assembly 11 and the center hole of the insulating plate 22. On the other hand, a lead tab 15 of the cathode 12 is brought and connected to the lower lid 26 by welding, passing through the center hole of the insulating plate 21. After an appropriate amount of electrolyte is poured into the cell case, the opening of the case 20 is sealed in airtight and liquid-tight fashion by mounting the sealing member 23 with a packing applied to the circumference thereof on a step 20a formed in the upper side of the cell case and caulking the top end of the case inside. Here, the step 20a is formed by giving groove processing on the outer side of the case after the electrode assembly 11 is inserted into the case 20. Fabricating of the cell is thus completed.

Figure 3:
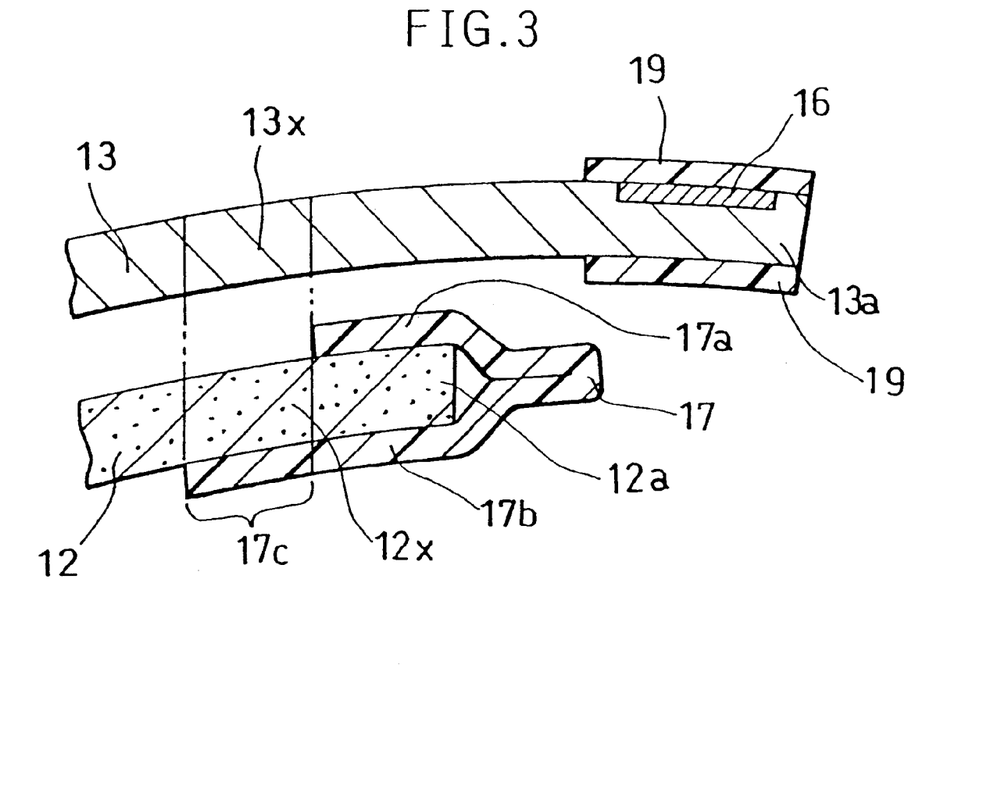
FIG. 3 is a cross sectional view illustrating an essential part of an electrode assembly of the same cell.

In the electrode assembly 11 having the above-described construction, the outermost end 12a of the cathode 12 is wrapped with a sheet of insulating film 17 on both inner and outer side, as shown in FIG. 3. This insulating film is made of an aramid resin film of 0.085 mm in thickness with a silicone resin adhesive applied onto one side thereof. Therefore, it can prevent the cathode material from being cracked and falling out, and also prevent the burr of the current collector exposed on the cross section of the cathode from breaking through the separator. Of the insulating film 17, the section 17b wrapping the inner side of the cathode is longer than the section 17a wrapping the outer side of the cathode by a length of the section 17c. In consequence, at the outermost end of the cathode, the section 12x reacts only with the anode positioned in the outer side of the cathode. The section of the anode facing the section 12x is denoted by 13x. In this example, the insulating film 17 covers the outer side of the cathode for 3 mm width and the inner side of the cathode for 8 mm width. Numeral 19 denote an insulating film wrapping the anode current collector 16.

Figure 8:
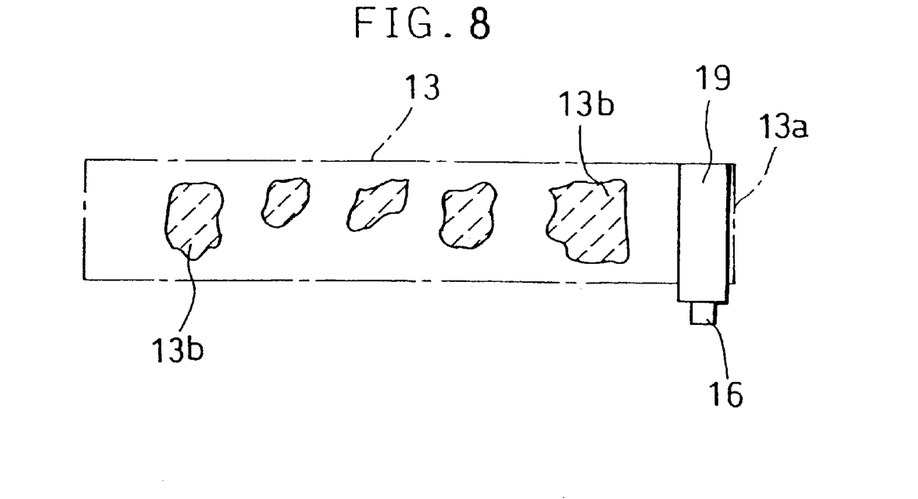
FIG. 8 is a development of the anode at the last stage of discharge.

When a cell having such a construction is forcedly discharged at the last stage of discharge, in the anode 13, the section 13x opposite the section 12x of the cathode reacts more intensely than other sections. Consequently, the light metal in the section 13x is consumed more rapidly; as a result, the anode metal 13b in the inward side from the section 13x is disconnected from the current collector 16 in the section 13x, as shown in FIG. 8. The anode light metal disconnected from the current collector 16 will not react any more, and therefore it will not electrolytically plate onto the cathode. In consequence, an internal short circuit or various troubles caused thereby will not occur.

The outermost end 12a of the cathode 12 is wrapped with the insulating film 17 as described above, so that it does not react with the anode. A section 12x neighboring the outermost end 12a increases in the absorbed light metal ion concentration with the progress of discharge, which results in differing light metal ion concentration between the section 12x and the outermost end 12a. In order to offset this difference, there occurs diffusion of the light metal ions absorbed in the section 12x toward the outermost end 12a; however, since the diffusion advances very slowly, light metal ions in the electrolyte are incorporated into the outermost end 12a through the interface between the section 12x and the outermost end 12a. As a result, the light metal ion concentration in the electrolyte decreases, with resulting acceleration of dissolution of light metal from a section 13x of the anode, which promotes anode consumption.

In order to reduce such earlier consumption of the section 13x of the anode, it is desirable to minimize the area of the outermost end 12a which is a nonreactive section of the cathode with the anode.

The insulating film 17, on the other hand, plays a major role in preventing short circuit due to a burr at an end face of the cathode and separation of the cathode mixture from the cathode. When it is intended to minimize the area of the nonreactive section of the cathode as noted above, the insulating film 17 is reduced in the area of a section 17a covering the cathode, failing to play its role, such as prevention of short circuit, sufficiently. Therefore, the width of the section 17a of the insulating film 17 is so set as to hold compatibility between the above-mentioned role of the insulating film 17 and the above-mentioned reduction of earlier consumption of the anode.

Figure 4:
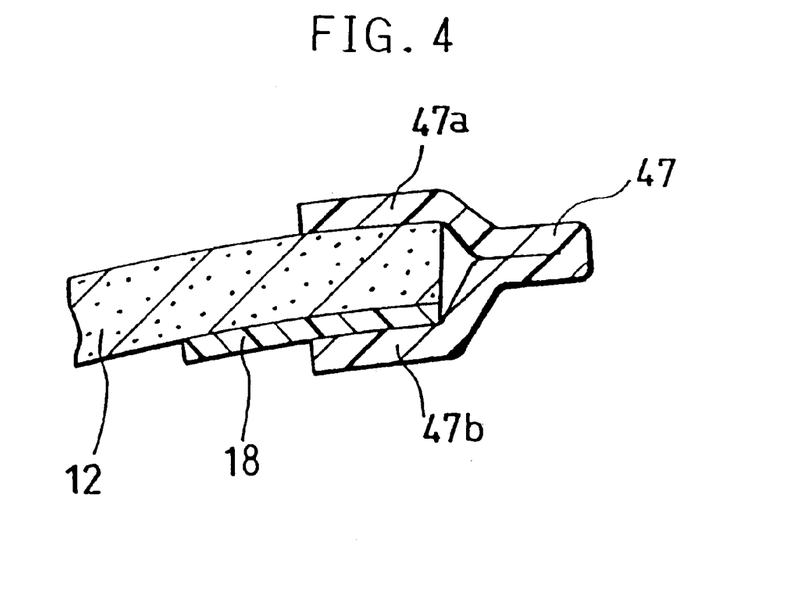
FIG. 4 is a cross sectional view showing the construction of the outermost end of the cathode in another example.

FIG. 4 shows a variation of the construction of wrapping the outermost end 12a of the cathode 12 with the insulating film. In this example, a film 18 for suppressing the cathode reaction and a film 47 wrapping the outermost end 12a of the cathode are separate. Therefore, the film 47 is applicable as far as it can serve as the insulator and can prevent the cathode mixture from falling out. On the other hand, since the film 18 is for suppressing the reaction, it should not necessarily be made of an insulating material. It can be made of an electrochemically inert metal.

Figure 5:
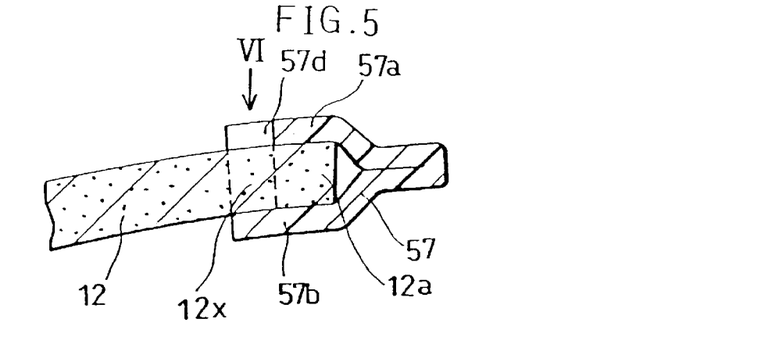
FIG. 5 is a cross sectional view showing the construction of the outermost end of the cathode in still another example.
Figure 6:
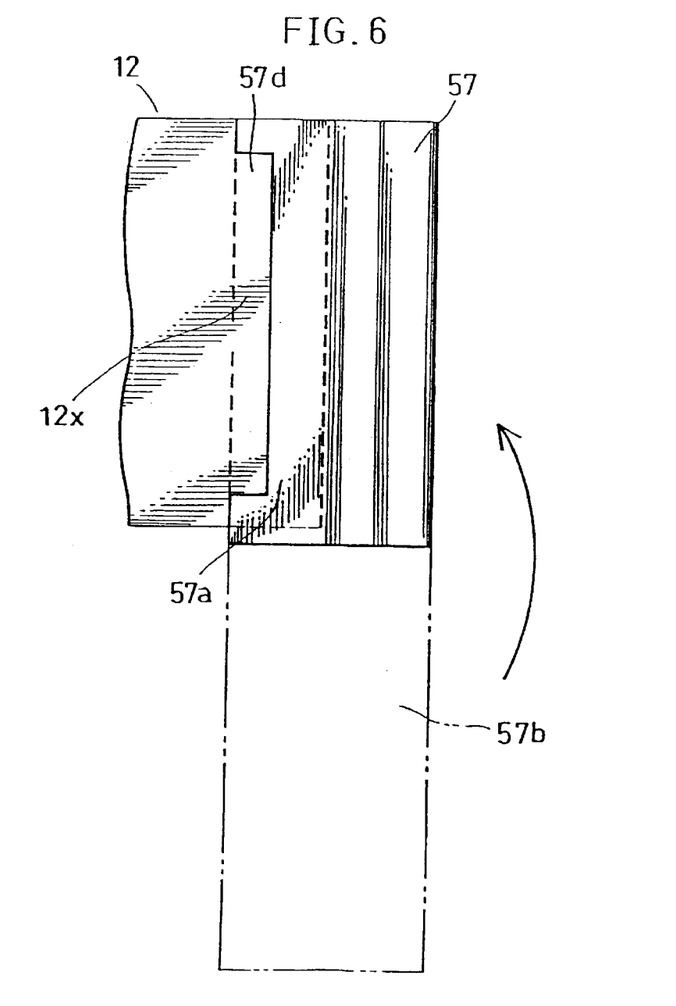
FIG. 6 is a view seeing the cathode in FIG. 5 from VI direction.

FIG. 5 shows still another example. Made of a sheet of film 57, a section 57a wrapping the outer side of the cathode is provided with a cut-out portion 57d, and the cathode exposed at the cut-out portion 57d reacts with the anode 13x opposite the cathode. A section 57b wrapping the inner side of the cathode is connected with the section 57a wrapping the outer side of the cathode in the lower side of the cathode, as shown in FIG. 6. In this example, the outer side of the cathode is covered for 3 mm width and the cut-out portion 57d is about 1 mm width.

In this structure, compared with the structures shown in FIG. 3 and FIG. 4, the area of the nonreactive section at the outermost end 12a of the cathode 12, which is so designed not to react with the anode external to the cathode, is reduced, because it is covered with an insulating film 57a. Therefore, consumption of the section 13x of the anode is prolonged, which avoids earlier consumption of the anode. A section 57a of the insulating film 57 covers the top and bottom end faces of the cathode, together with an internally folded-back portion 57b of the insulating film 57 and prevents short circuit due to the burr located at the end face of the cathode and separation of the cathode mixture from the cathode. The section 12x of the cathode 12, which section is exposed to a cut-out portion of the insulating film 57, faces the section 13x of the anode. Consumption of the anode preferentially progresses at the section 13x that faces the section 12x of the cathode and up and down sides of the section 12x, and the section 13x is separated from a current collector at the last stage of discharge. In the structure shown in FIG. 5, of the outermost end 12a of the cathode, an area which reacts with the anode only at its outer side and an area which does not react with the anode at both the inner and outer sides thereof are most reduced in size. According to this structure, an outermost spiral of the anode can be best utilized and the capacity can be increased.

Figure 7:
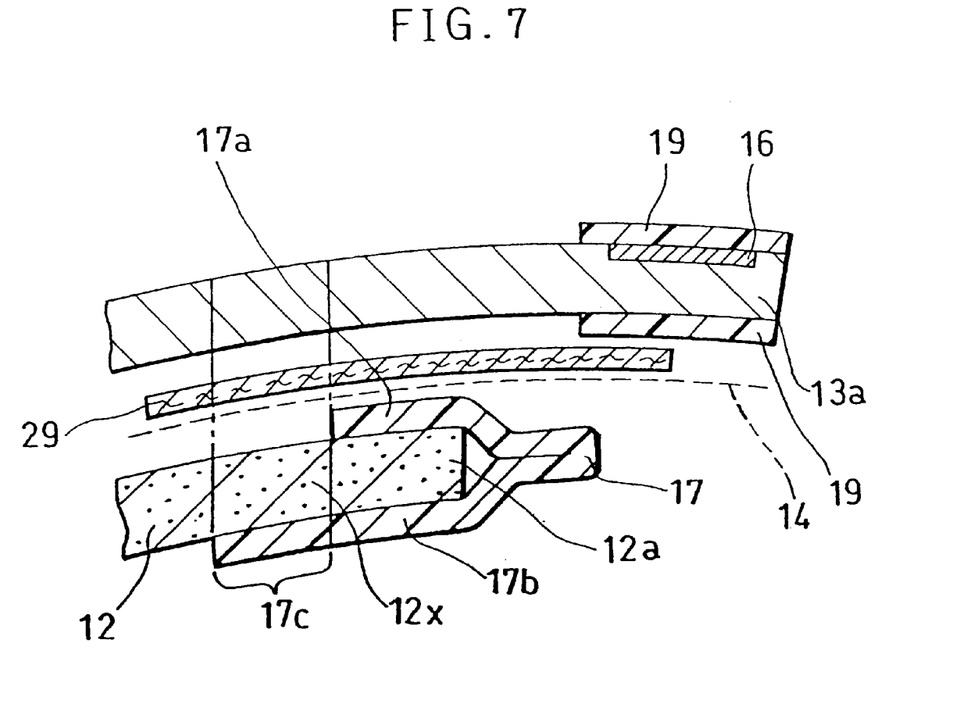
FIG. 7 is a cross sectional view showing the construction of an outermost end of the cathode in still further example.

FIG. 7 shows a variation of FIG. 3. In FIG. 3, the section 12x of the cathode does not react with the anode on its inner side and reacts only with the section 13x of the anode on its outer side due to the presence of the insulating film 17. Consequently, the anode metal in the section 13x of the anode might be depleted too fast. In FIG. 7, in order to alleviate to some extent the reaction between the anode 13x and the cathode 12x, a reaction controlling layer 29 made of a non-woven fabric is disposed so that it covers the vicinity of the section 13x of the anode 13. The reaction controlling layer 29 is preferably disposed between the separator 14 denoted by a dotted line in the figure and the anode 13, and it is particularly preferable to be disposed so that it is pressed and attached onto the anode side facing the cathode. This reaction controlling layer controls or alleviates movement of anode metal ions, for example lithium ions, from the anode 13 to the cathode 12, therefore the rate of depletion or dissolution of the anode section 13x is delayed compared to the case in which the reaction controlling layer 29 is not disposed. Consequently, the anode metal in the inward side from the section 13x will not be disconnected in an early stage because of a premature depletion of the section 13x.

Also in the construction shown in FIGS. 4 and 5, the reaction controlling layer can be disposed so that it covers the anode section 13x facing the cathode section 12x. In doing so, premature depletion of the anode metal in the section 13x can be avoided. The reaction controlling layer for controlling the reaction of the anode used here controls the reaction weakly compared to the above-mentioned layer for suppressing the reaction between the cathode and the anode on its inner side. Consequently, ionically impermeable materials are not applicable.

EMBODIMENT 2

Figure 9:
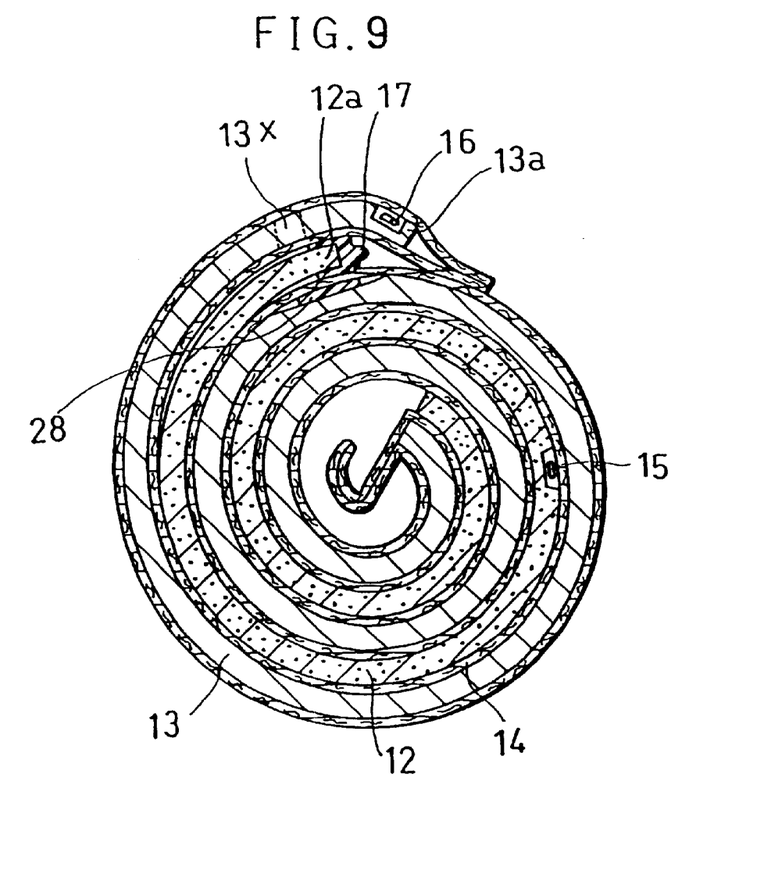
FIG. 9 is a horizontal cross sectional view illustrating an electrode assembly in another example of the present invention.

FIG. 9 is a horizontal cross sectional view of a non-aqueous electrolyte cell according to the present embodiment. In FIG. 9, the same reference numerals denote the same elements as in FIG. 2.

In this embodiment, the insulating film 17 just protects the outermost end 12b of the cathode 12, that is, it is attached to the cathode with the inside covering part and the outside covering part in the same length. On the other hand, in the anode 13, a supplementary insulating tape 28 is attached to the outer side of the section that is one revolution inward from the outermost spiral.

In this non-aqueous electrolyte cell, the supplementary insulating tape 28 attached to the outer side of the section that is one revolution inward from the outermost spiral of the anode 13 is interposed between the anode and the inner side in the vicinity of the outermost end 12a of the cathode 12. Therefore, the section of the cathode 12 facing the supplementary insulating tape 28 is electrically separated from the anode 13 with the tape 28 and has only its outer side facing the anode 13. The section 13x of the anode 13 facing the above-mentioned section of the cathode is positioned in the place slightly going inwardly from the current collector 16. Consequently, when the cell is discharged forcedly at the last stage of discharge, the specific section 13x of the anode 13 is consumed prior to other sections, thereby the remaining anode light metal is disconnected from the current collector.

In the above embodiment, for simplifying, it was described that the cathode reacts with the anode facing thereto. For example, it was described, in FIG. 3, the cathode section 12x reacts directly with the anode section 13x. However, it goes without saying that, in effect, the section contacting the section 12x and the section contacting the section 13x are involved in the above reaction.

In the followings, the examples of the present invention will be described.

EXAMPLE 1

A 2/3A size cell constituted as shown in FIG. 3 is fabricated. The cathode has a thickness of 0.43 mm, a length of 230 mm and a height of 26 mm; the anode has a thickness of 0.17 mm, a length of 260 mm and a height of 24 mm. Of the insulating film 17 wrapping the outermost end of the cathode 12, the section 17a covering the outer side of the cathode is 3 mm in width and the section covering the inner side of the cathode is 8 mm in width.

EXAMPLE 2

In the construction as shown in FIG. 5, the section 57b covering the inner side of the cathode of the insulating film 57 is 3 mm in width, the section 57a covering the outer side of the cathode of the same film is 3 mm in width, and the cut-out portion 57d is 1 mm in width and 20 mm in height.

EXAMPLE 3

A cell is fabricated in the same manner as in Example 1 except that a non-woven fabric of polypropylene which is 18 g/m$^2$ in METSUKE weight and 80 $\mu$m in thickness, cut into a size of 25 mm in length and 24 mm in height, is interposed between the anode section 13x and the separator.

COMPARATIVE EXAMPLE 1

As shown in FIG. 10, an anode current collector 96 is disposed at one revolution inward from an outermost end 93a of an anode 93. The section of a cathode 92 outwardly beyond the section opposite the current collector toward an outermost end 92a faces only the inner anode. That is, the anode is extended outwardly in a circumference sense one revolution beyond the location of the current collector, and further the anode end, the cathode comes to the outermost spiral.

A cell is built with the above construction. The size of the cathode is the same as the one used in Example 1, yet the anode has a thickness of 0.17 mm and a length of 225 mm.

COMPARATIVE EXAMPLE 2

The conditions are the same as in Comparative Example 1 except that the cathode has a thickness of 0.41 mm and the anode has a thickness of 0.18 mm.

Figure 12:
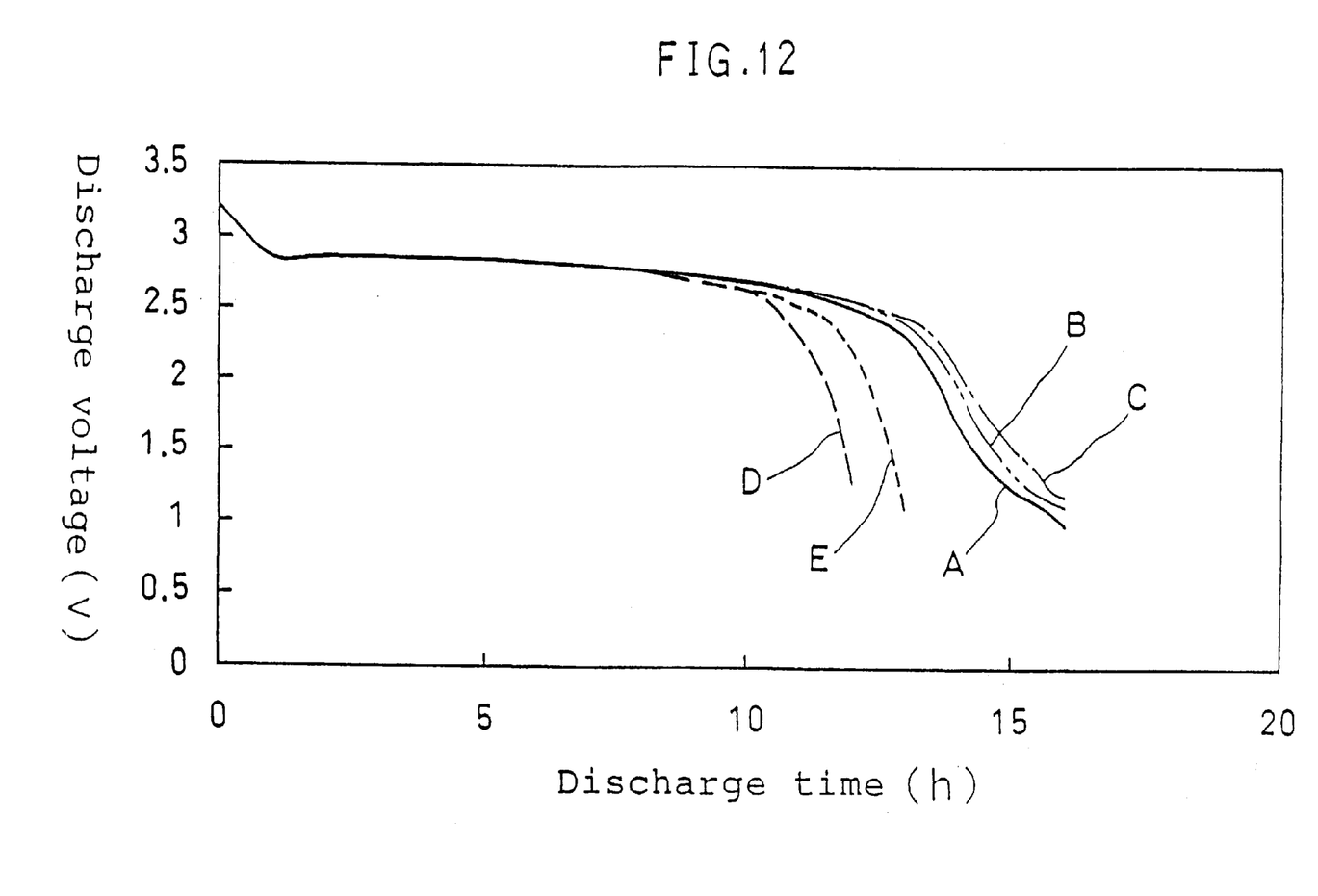
FIG. 12 is a graph showing the discharge characteristics of a non-aqueous electrolyte cell according to the present invention and those of a cell in the comparative example.

Non-aqueous electrolyte cells A, B, C, D and E of Examples 1, 2 and 3 and Comparative Examples 1 and 2, respectively, are discharged at a constant current of 500 mA and discharge curbs are shown in FIG. 12. As apparent from FIG. 12, the cell A has a largest discharge capacity in the comparison of the cell A, D and E.

In the cell D of Comparative Example 1, the cathode is disposed on both sides of an anode disconnecting part where the anode metal is depleted and disconnected from the current collector at the last stage of discharge. On the other hand, in the cell A of Example 1, in the place to become an anode disconnecting part at the last stage of discharge, the cathode is disposed only on the inner side of the anode. Consequently, in the cell A, the anode current collector is disconnected from the anode metal relatively late at the last stage of discharge compared to the cell D. As a result, the discharge capacity of the cell A is improved compared to the cell D. On the other hand, in the cell E of Comparative Example 2, the anode is thickened to delay the disconnection of the anode metal from the current collector. However, in the cell E, the cathode should be made thinner for the thickened anode. The cell A has a larger discharge capacity than the cell E because the cell A has a thicker cathode than that of the cell E.

In the comparison of the cells A, B and C, the cell B has a smaller cathode section 12x facing only with the anode than that of the cell A. Consequently, depletion of the anode section 13x is delayed, and as a result, the anode section in the outermost spiral is better used, so the capacity is enlarged. In the cell C, the non-woven fabric interposed between the cathode 12x and the anode 13x control or alleviate the movement of lithium ions, and moreover, the distance between the cathode and the anode is bigger for the presence of the non-woven fabric. In consequence, the depletion of the anode 13x is delayed, and also the timing of the disconnection of the anode metal from the current collector is delayed, and as a result, the capacity is enlarged.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A non-aqueous electrolyte cell comprising an anode consisting essentially of a light metal, a cathode, a separator interposed between said anode and cathode, an organic electrolyte and a cell case containing said anode, cathode, separator and organic electrolyte; said anode, cathode and separator being spirally wound so that said anode is disposed on the outer side of said cathode to form an electrode assembly, wherein the outermost end of said cathode is wrapped with an electrically insulating material, wherein said anode has a section provided with an anode current collector proximate to the outermost end thereof, said section being positioned beyond the wrapped outermost end of said cathode in the winding direction of the spiral, and wherein a reaction suppressing layer is present between a cathode section proximate to the outermost end and the anode positioned on the inner side of said cathode section, whereby only the outer side of said cathode section substantially reacts with the anode.

2. The non-aqueous electrolyte cell in accordance with claim 1, wherein said reaction suppressing layer is disposed on the inner side of said cathode section in the vicinity of the outermost end.

3. The non-aqueous electrolyte cell in accordance with claim 1, wherein said reaction suppressing layer is disposed on the outer side of the anode facing the inner side of said cathode section in the vicinity of the outermost end.

4. A non-aqueous electrolyte cell comprising an anode consisting essentially of a light metal, a cathode, a separator interposed between said anode and cathode, an organic electrolyte and a cell case containing said anode, cathode, separator and organic electrolyte; said anode, cathode and separator being spirally wound so that said anode is positioned on the outer side of said cathode to form an electrode assembly, wherein the outermost end of said cathode is wrapped with a first film made of an ionically impermeable and electrically insulating material, wherein said anode has a section provided with an anode current collector proximate to the outermost end thereof, said section being positioned beyond the outermost end of the cathode wrapped with said first film in the winding direction of the spiral, and wherein the inner side of cathode section proximate to the outermost end is covered with a second film made of an ionically impermeable and electrically insulating material without forming a gap between said first film and said second film, whereby only the outer side of said cathode section proximate to the outermost end substantially reacts with the anode.

5. The non-aqueous electrolyte cell in accordance with claim 4, wherein an end of said first film covers an end of said second film.

6. The non-aqueous electrolyte cell in accordance with claim 4, wherein said second film is constituted with an extended part of the end of said first film.

7. The non-aqueous electrolyte cell in accordance with claim 4, wherein the anode current collector is positioned at the outermost end of the anode.

8. The non-aqueous electrolyte cell in accordance with claim 4, wherein a reaction controlling layer for delaying the anode reaction is interposed between the outer side of said cathode section and the anode facing said outer side of said cathode section.

9. A non-aqueous electrolyte cell comprising an anode consisting essentially of a light metal, a cathode, a separator interposed between said anode and cathode, an organic electrolyte and a cell case containing said anode, cathode, separator and organic electrolyte; said anode, cathode and separator being spirally wound so that said anode is positioned on the outer side of said cathode to form an electrode assembly, wherein the outermost end of said cathode is wrapped with a first film made of an ionically impermeable and electrically insulating material, wherein said anode has a section provided with an anode current collector proximate to the outermost end thereof, said section being positioned beyond the outermost end of said cathode wrapped with said first film in the winding direction of the spiral, and wherein a section of the anode positioned in the inner side of a cathode section proximate to the outermost end and facing the cathode is covered with a second film made of an ionically impermeable and electrically insulating material, whereby only the outer side of said cathode section proximate to the outermost end substantially reacts with the anode.

10. The non-aqueous electrolyte cell in accordance with claim 9, wherein the anode current collector is positioned at the outermost end of the anode.

11. The non-aqueous electrolyte cell in accordance with claim 9, wherein a reaction controlling layer for delaying the anode reaction is interposed between the outer side of said cathode section and the anode facing said outer side of said cathode section.

12. A non-aqueous electrolyte cell comprising an anode consisting essentially of a light metal, a cathode, a separator interposed between said anode and cathode, an organic electrolyte and a cell case containing said anode, cathode, separator and organic electrolyte; said anode, cathode and separator being spirally wound so that said anode is positioned on the outer side of said cathode to form an electrode assembly, wherein both inner and outer sides of an outermost end of said cathode are wrapped with an ionically impermeable and electrically insulating film for nearly the same width, wherein said anode has a section provided with an anode current collector proximate to the outermost end thereof, said section being positioned beyond the wrapped outermost end of said cathode in the winding direction of the spiral, and wherein a part of said film covering the outer side of the cathode is provided with a cut-out portion to expose the cathode formed by cutting inward side film, whereby only the outer side of a cathode section proximate to the outermost end substantially reacts with the anode.

13. The non-aqueous electrolyte cell in accordance with claim 12, wherein the anode current collector is positioned at the outermost end of the anode.

14. The non-aqueous electrolyte cell in accordance with claim 12, wherein a reaction controlling layer for delaying the anode reaction is interposed between the outer side of said cathode section and the anode facing said outer side of said cathode section.

* * * * *